United States Patent
Hacker (12)

(10) Patent No.: US 6,601,994 B2
(45) Date of Patent: Aug. 5, 2003

(54) COMPACT HUB ASSEMBLY

(75) Inventor: Robert W. Hacker, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/006,853

(22) Filed: Dec. 5, 2001

(65) Prior Publication Data

US 2003/0103706 A1 Jun. 5, 2003

(51) Int. Cl.[7] ................................................ F16C 19/38
(52) U.S. Cl. ........................................ 384/571; 384/589
(58) Field of Search ................................. 384/589, 571, 384/586, 544, 587

(56) References Cited

U.S. PATENT DOCUMENTS

| | | |
|---|---|---|
| 606,635 A | 6/1898 | Timken et al. |
| 2,034,545 A | 3/1936 | Umstattd |
| 3,397,020 A | 8/1968 | Edwards |
| 5,735,612 A | 4/1998 | Fox et al. |

*Primary Examiner*—Lenard A. Footland
(74) *Attorney, Agent, or Firm*—Polster, Lieder, Woodruff & Lucchesti, L.C.

(57) ABSTRACT

A wheel hub assembly for an automotive vehicle has a spindle with a flange by which a wheel is mounted, the spindle being supported by a support member and being rotated through a universal joint. Axially spaced inboard and outboard bearing members are positioned between the spindle and the support member. The spindle has a tapered raceway forming a cone of the outboard bearing member, the raceway lying inboard of the flange. The outboard bearing member cone raceway has no thrust rib at its large, outboard end, and a large radius is provided between the outboard end of the raceway and the flange. An outboard bearing member cup has a raceway tapered complementarily to the cone raceway and a thrust rib at its outboard end. Preferably, the inboard bearing member has a cone with no thrust rib, and a cup with a thrust rib.

8 Claims, 2 Drawing Sheets

COMPACT HUB ASSEMBLY

CROSS REFERENCE TO RELATED APPLICATIONS

The subject matter of this application is related to that of an application Ser. No. 09/996,296 of Robert W. Hacker.

STATEMENT REGARDING FEDERALLY SPONSORED RESEARCH OR DEVELOPMENT

Not Applicable.

BACKGROUND OF THE INVENTION

Automotive vehicle wheels are typically supported on two rows of rolling elements (inboard and outboard bearing members) with opposing angular contact to oppose the moments placed on them in cornering. The wheel is typically attached to a flange on a spindle of a hub on which bearing inner races (cones) are located. A suspension component, attached to control arms, springs, and, in the case of front wheel drive, a steering linkage, typically called a knuckle, is a support for the bearing and wheel. The bearing outer races (cups) are mounted to or within the knuckle. A universal joint, commonly a constant velocity joint (CVJ), which is what is illustrated and described herein, transmits torque from a drive shaft to the wheel hub. The bearing is trapped between the wheel hub and the CVJ. When tapered roller bearings are used, the rollers are typically guided by thrust ribs on the cones of the bearings. Each cone at the end of its thrust rib has a back face, and the back face on the inboard cone is abutted with a face on the CVJ. The rib face which guides the rollers is a substantial distance axially from the back face abutting the CVJ to allow thickness for sufficient strength. This rib width causes the distance from the CVJ to the wheel flange to be larger than necessary, causing difficulty in optimizing the steering geometry of the vehicle. The outboard bearing cone raceway is machined on the spindle, and conventionally, the cone raceway has at its outboard end, a thrust rib, integral with the spindle, which meets the raceway at a sharp intersection, actually, an undercut with a very small radius and chamfer. This produces a stress concentration factor that is as high as 4.0, or higher, in the area between the cone raceway and the flange to which the vehicle wheel is attached.

The use of ribbed cups in tapered roller bearings in vehicle wheel supports is old. Patents to applicant's assignee and its predecessors directed to the use of such cups extend for over a century, see U.S. Pat. Nos. 606,635 (1898), 2,034,545, 3,397,020, and 5,735,612, for example. However, none has addressed the particular problems to which the present invention is directed, nor suggested the solution that the present invention presents.

One of the objects of this invention is to provide a hub construction that reduces the stress concentration factor.

Another of the objects is to shorten the distance between the universal joint, in the illustrative embodiment a CVJ, and the hub, and to permit a reduction in weight of the hub assembly.

Other objects will occur to those skilled in the art in the light of the following description and accompanying drawings.

BRIEF SUMMARY OF THE INVENTION

In accordance with this invention, generally stated, a wheel bearing assembly is provided which includes a support structure, in the embodiment shown, a knuckle, a universal joint, outboard and inboard bearing members, each having a roller bearing cup fixedly attached to the knuckle, each cup having a tapered roller bearing race, a wheel hub including a spindle having a wheel flange suitable for attaching a wheel, and two cones each having a race, the outboard cone race being machined into the hub. Two sets of rollers are interposed between respective cone and cup races, contacting their races at an angle to the wheel hub axis and opposing each other. The outboard cone race has no thrust rib, and meets the spindle between the race and the wheel flange at a large radius, or none at all, in effect an infinite radius. The thrust rib for the outer bearing member is at the outboard end of the cup raceway. By eliminating the cone thrust rib and its sharp radius, the stress concentration factor at the end of the cone race is greatly reduced or eliminated. Because of that, the spindle section at the outboard raceway can be reduced. If the inboard cone is also made without a thrust rib, and the thrust rib is formed at the inboard end of the cup raceway, the universal joint can be moved closer to the wheel flange by the distance formerly occupied by the thrust rib on the cone, which helps reduce the scrub radius. Alternatively, the thrust rib on the inboard cone can be supplied by a lip on a surface of a universal joint, as of the shell of the CV joint, as described in the application of Hacker, DN8149, to which reference is made above. In either case, the inboard cone has no thrust rib integral with it.

DETAILED DESCRIPTION OF THE PREFERRED EMBODIMENT OF THE INVENTION

Figure 1:
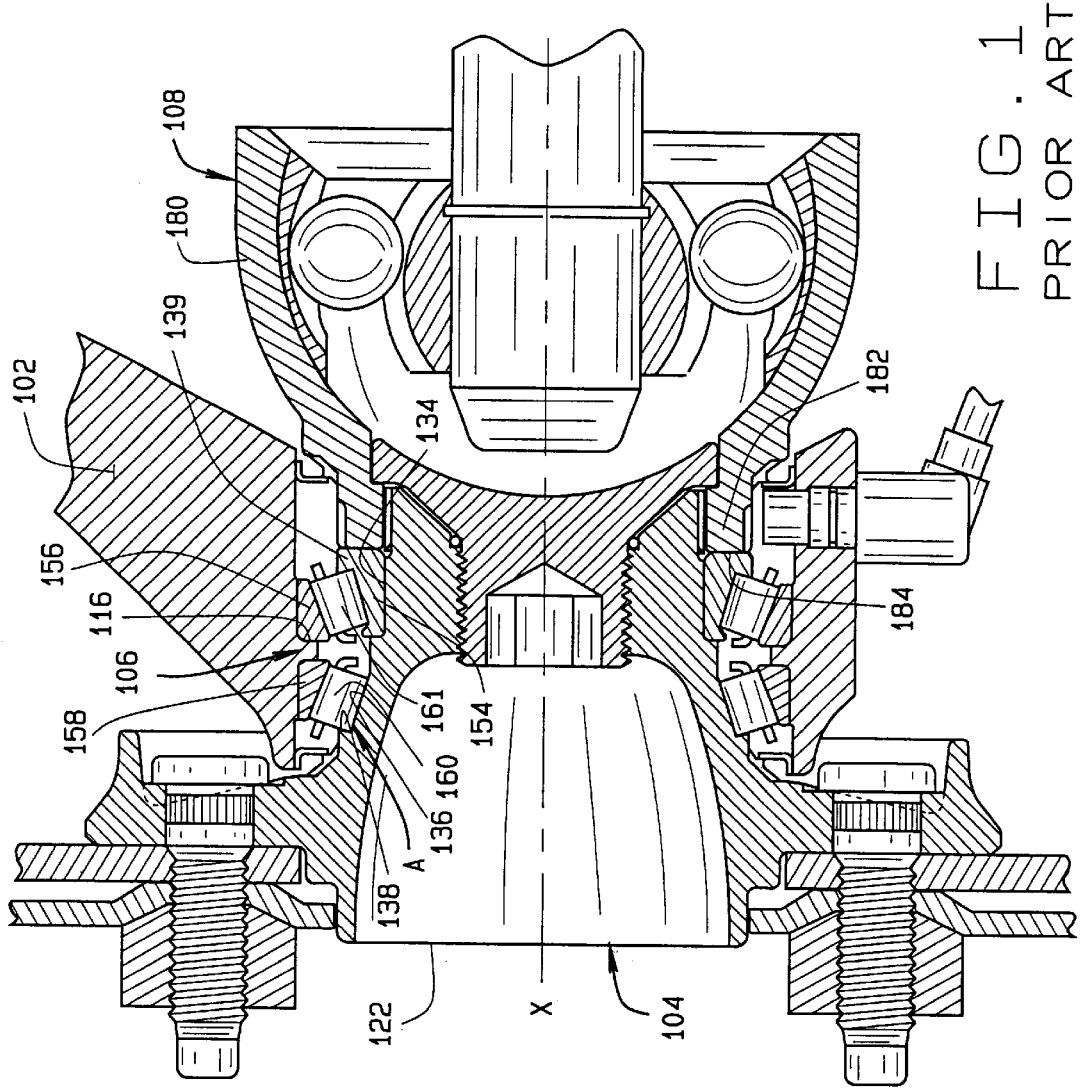
FIG. 1 is a longitudinal sectional view of a prior art hub assembly.

Various parts of the hub assembly of this invention will be described in detail in the description of FIG. 2, but to illustrate the differences between the prior art and the present invention, a brief description of a prior art device will first be given. Referring, then, to FIG. 1 of the drawing, a support member 102 carries a conventional hub assembly 104. In the hub assembly illustrated, a CV joint 108 has an outer joint member or shell 180, with an outboard cylindrical end 182 with an end face 184 that bears against a back face of a heavy thrust rib 139 of a cone 154. The cone 154 forms part of an inboard bearing member of a bearing 106, positioned between the support member 102 and a spindle 122, a part of the hub assembly 104. The cone 154 is seated in a seat 134 in the spindle 122. An inboard cup 156 is seated in a seat of the support member 102, abutting an annular boss 116. An outboard raceway 136, machined on the outer surface of the spindle 122, terminates in a thrust rib 138 at a sharp angle A, actually, an undercut with a very small radius and chamfer. The outboard raceway 136 forms a cone part of an outboard bearing member of the bearing 106. The outboard bearing member includes an outboard cup 158. Tapered roller bearings 160 and 161 are mounted in the outboard and inboard and bearing members, respectively.

Figure 2:
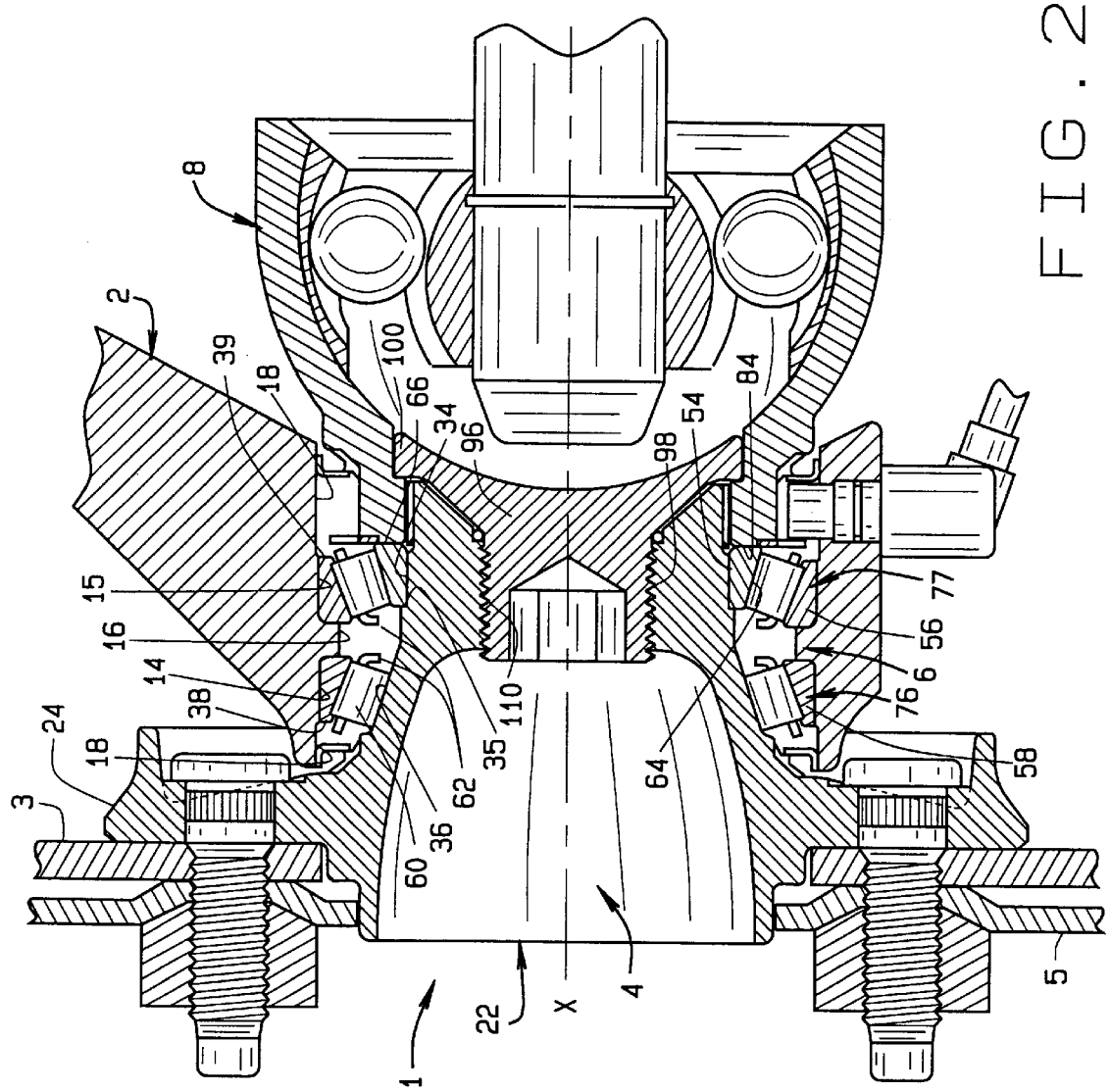
FIG. 2 is a longitudinal sectional view of a hub assembly constructed in accordance with and embodying the present invention.

Referring now to FIG. 2 of the drawing for a description of the preferred embodiment of this invention, reference numeral 1 indicates a hub assembly, which couples a road wheel 5 and a brake rotor 3 of an automotive vehicle to the engine system of the vehicle. The suspension system in the illustrative embodiment shown, includes a suspension member 2 that is designed to move generally vertically on the vehicle against the bias of a spring or torsion bar. Where the road wheel is at the front of the vehicle and thus steers the vehicle, the suspension member 2 typically takes the form of a steering knuckle, which is what is illustrated. On the other hand, where the road wheel is at the rear of the vehicle, the member 2 may take the form of a so-called "upright". In addition, the hub assembly 1 includes a spindle 4, which rotates in the member 2 on a bearing 6 located between the hub and the member 2. The bearing 6 is made up of an outboard bearing member 76 and an inboard bearing member 77. The bearing 6 enables the spindle 4 to rotate about an axis X and is fixed in position with respect to the member 2. The hub assembly 1 includes a constant velocity joint 8, which couples the hub 4 with an axle drive shaft.

As has been indicated, in the embodiment shown, the suspension member 2 is a knuckle. The knuckle 2 serves as a housing for the bearing 6, and to this end has a cylindrical passage with two stepped annular seats, an outboard seat 14 and an inboard seat 15. The seats 14 and 15 end at their inner ends at a shoulder 16, and at their outer ends, open into counterbores 18 which in turn open out of the knuckle 2.

The spindle 22 has a flange 24 that is formed integrally with it as a single casting or forging and lies outboard of the knuckle 2. The spindle 22 is hollow, with a bell-shaped cavity convergent inboardly, with an internally threaded cylindrical passage 110 at its inboard end. The hub flange 24 carries threaded studs 30 that pass through the brake rotor and are engaged by lug nuts for securing the wheel and the brake rotor to the flange.

The spindle 22 has at its inboard end an external spline 32. The bearing seat 34 has at its outboard end a shoulder 35. The spindle 22 has, machined on its outer surface, a tapered raceway 36 that lies within the ambit of seat 14 of the member 2. The small end of the raceway 36 is presented toward the bearing seat 34. The large end of the raceway extends beyond outboard ends of tapered rollers 60. The raceway 36, while integral with the spindle 22 of the hub 4, actually constitutes the cone of the outboard member 76 of the bearing 6. An outboard cup 58 of the outboard bearing member is press fitted in the seat 14, with an axially inboard face abutting a face of the shoulder 16, and with a thrust rib 38 positioned to engage the large end of the rollers 60.

The inboard member 77 of the bearing 6 includes an inner race in the form of an inboard cone 54, press fitted onto the bearing seat 34, and an outer race in the form of an inboard cup 56, located around the cone 54 and press fitted into the inboard seat 15 of the support 2. The cup 56 has at its inboard end, a thrust rib 39. Rolling elements in the form of tapered rollers 60 and 61 are positioned between the raceway 36 and the cup 58 of the outboard bearing member 76, and between the raceway 64 and the cup 56 of the inboard bearing member 77, respectively. Each row of tapered rollers 60 and 61 includes a cage 62 for maintaining the proper spacing between the rollers 60 and 61. The cone 54 has at its large end a back surface 66, but no integral thrust rib.

In this embodiment, a cylindrical end 82 of a shell 80 has on its inside surface a spline complementary to the spline 32, and an internal annular shoulder 90. The end surface 84 of the end 82 is held in position tightly against the face 66 of the cone 54 by a retainer 96. The retainer 96 has an annular flange 100 seated against the shoulder 90 of the shell 80. The retainer 96 has a cylindrical outboard end 98 that is externally threaded, and a socket defined by a hexagonal side wall to accommodate a tool. The threaded end 98 of the retainer is threaded into the threaded passage 110 of the spindle 22.

By putting the thrust rib 38 on the cup 58 and eliminating the sharp angle between the end of the race 36 and what in the prior art devices was the thrust rib, permitting a large radius spaced from the outboard end of the race, the stress concentration factor for this area is reduced from the order of more than 4 to less than 2. The term "large radius" is used to embrace an infinite radius as well, which is the case when there is a flat space between the end of the race and the flange 24, but in any case, a radius such as to reduce the stress concentration factor to less than 2 in the area between the race 36 and the flange 24.

By eliminating the usual thrust rib on the cone of the inboard bearing member, the CVJ (or other universal joint) is moved closer to the wheel flange, thus more nearly optimizing the steering geometry of the vehicle.

Numerous variations in the construction of the device of this invention, within the scope of the appended claims will occur to those skilled in the art in the light of the foregoing disclosure. Merely by way of example, different arrangements of retaining means for the shell 80 can be provided, as is illustrated in an application of Robert W. Hacker, Attorney's docket 8149, filed Nov. 28, 2001. The supporting member may take the form of an upright, if torque is transmitted to the wheel through a universal joint. The two cups 56 and 58 may be united into a single double cup or may be formed integral with a housing that is bolted to the suspension member 2. If the universal joint is a CVJ, as illustrated, and the end surface 84 is provided with a lip to serve as a thrust rib, as described in applicant's application DN 8149, the cup thrust rib can be eliminated, but that is not the preferred arrangement. As has been indicated, other forms of universal joint can be used, either with a surface that serves as a thrust rib for the inboard cone, or, when the inboard cup is provided with a thrust rib, as a back-up to the inboard cone. These are merely illustrative.

Having thus described the invention, what is claimed and desired to be secured by Letters Patent is:

1. In an automotive vehicle having a wheel hub with a flange by which a wheel is mounted, said hub being supported by a support member, said support member having a cylindrical passage through which a spindle portion of the hub assembly extends, said hub being rotated through a universal joint, said spindle carrying said flange outboard of said cylindrical passage, and axially spaced inboard and outboard bearing members between said spindle and said support member within said passage, said spindle having a tapered raceway forming a cone of said outboard bearing member, said raceway lying inboard of said flange, the improvement comprising said outboard bearing member cone raceway being tapered convergently inboardly and having no thrust rib at its large, outboard end, and a large radius between said outboard end of said raceway and said flange, and an outboard bearing member cup having a raceway tapered complementarily to the cone raceway and a thrust rib at its outboard end and said inboard bearing member having a cone with a raceway tapered convergently outboardly and having no thrust rib as a part of its large, inboard end.

2. The improvement of claim 1 wherein said universal joint is a CV joint, with an outer member or shell having a cylindrical end face, and said inboard bearing member is a tapered roller bearing with a cone having a raceway and a back face, said hub shell cylindrical end face abutting said cone back face.

3. The improvement of claim 1 wherein said inboard bearing member has a cup with a thrust rib.

4. The improvement of claim 1 wherein the stress concentration factor in the hub in the area between the outboard cone raceway and the flange is less than two.

5. The improvement of claim 1 wherein the outboard cup is secured in a seat in a wall defining the cylindrical passage of said supporting member.

6. In combination with an automotive vehicle, a hub assembly for coupling a road wheel to a suspension system of said automotive vehicle, said hub assembly comprising a hub with a flange by which said wheel is mounted, said hub being supported by a support member and rotated through a CV joint, and axially spaced inboard and outboard bearing members between said hub and said support member, said outboard bearing member being a tapered roller bearing a cone raceway of which is formed on an external surface of said hub, the improvement comprising said outboard bearing member cone raceway having no thrust rib and ending in a large radius between said raceway and said flange, an outboard bearing member cup raceway having a thrust rib at its outboard end, and said inboard bearing member having a cone with a back surface but no integral thrust rib and a cup having a thrust rib at its inboard end.

7. In an automotive vehicle having a wheel hub with a flange by which a wheel is mounted, said hub being supported by a support member, said support member having a cylindrical passage through which a spindle portion of the hub assembly extends, said hub being rotated through a universal joint, said spindle carrying said flange outboard of said cylindrical passage, and axially spaced inboard and outboard bearing members between said spindle and said support member within said passage, each of said inboard and outboard bearing members having a cone and a cup, the improvement comprising at least one of said bearing members having a cone with no thrust rib at a large, outboard end, and a cup with a thrust rib at its outboard end.

8. In an automotive vehicle having a wheel hub with a flange by which a wheel is mounted, said hub being supported by a support member, said support member having a cylindrical passage through which a spindle portion of the hub assembly extends, said hub being rotated through a universal joint, said spindle carrying said flange outboard of said cylindrical passage, and axially spaced inboard and outboard bearing members between said spindle and said support member within said passage, each of said inboard and outboard bearing members having a cone and a cup, the improvement comprising both of said bearing members having a cone with no thrust rib at a large, outboard end, and a cup with a thrust rib at its outboard end.

* * * * *